United States Patent [19]

Shimizu et al.

[11] Patent Number: 4,804,913

[45] Date of Patent: * Feb. 14, 1989

[54] POSITIONING CONTROL SYSTEM FOR A FLUID POWERED CYLINDER

[75] Inventors: Wataru Shimizu; Yasuhiro Yuasa; Yuuji Matsuki, all of Tokyo, Japan

[73] Assignee: Kabushiki Kaisha SG, Tokyo, Japan

[*] Notice: The portion of the term of this patent subsequent to Mar. 17, 2004 has been disclaimed.

[21] Appl. No.: 117,915

[22] Filed: Oct. 29, 1987

Related U.S. Application Data

[63] Continuation of Ser. No. 565,279, Dec. 20, 1983, abandoned.

[30] Foreign Application Priority Data

Dec. 23, 1982 [JP] Japan .................................. 57-225034

[51] Int. Cl.[4] ..................... G01B 7/14; G01N 27/72; G01R 33/00; G08C 19/16
[52] U.S. Cl. .................................... 324/208; 324/225; 324/226; 324/233; 340/870.32; 92/5 R
[58] Field of Search ............... 324/207, 208, 225, 226, 324/233; 340/870.31, 870.32, 870.34, 870.35, 870.36; 336/30, 45; 91/275, 361, 459; 92/5 R; 364/167, 170, 174; 318/611, 632, 657

[56] References Cited

U.S. PATENT DOCUMENTS

| | | | |
|---|---|---|---|
| 3,242,472 | 3/1966 | Anthony | 340/870.32 |
| 3,956,973 | 5/1976 | Pomplas | 324/208 |
| 4,514,689 | 4/1985 | Gerard | 340/870.36 |
| 4,556,866 | 3/1985 | Shimizu et al. | 324/208 |
| 4,651,073 | 3/1987 | Shimizu et al. | 318/632 |

Primary Examiner—Reinhard J. Eisenzopf
Assistant Examiner—Walter E. Snow
Attorney, Agent, or Firm—Spensley Horn Jubas & Lubitz

[57] ABSTRACT

A coil assembly including primary coils disposed at predetermined locations axially spaced from one another and secondary coils provided in association with these primary coils is fixed at one end of a fluid powered cyliner. A piston rod is slidably disposed through a space in the primary and secondary coils. Rings made of magnetic substance are provided on the piston rod with a predetermined axial interval therebetween. Each of the primary coils is excited with one of reference AC signals which are out of phase with one another and an output signal which is electrically phase-shifted in accordance with the position of the piston rod is obtained as a sum of output signals from the secondary coils. Piston rod position data is obtained by measuring the amount of the phase-shifting and is utilized for positioning control of the cylinder. The velocity and acceleration of the movement of the piston rod are detected on the basis of the detected position data and the amount of overrun is estimated in accordance with the detected velocity and acceleration to effect the most accurate positioning control. Each time the positioning is completed, the amount of overrun is corrected to improve the accuracy of a next positioning control.

25 Claims, 7 Drawing Sheets

POSITIONING CONTROL SYSTEM FOR A FLUID POWERED CYLINDER

This is a continuation of copending application Ser. No. 06/565,279 filed on Dec. 20, 1983, now abandoned.

BACKGROUND OF THE INVENTION

This invention relates to a positioning control system for a fluid powered cylinder and, more particularly, to a device for accurately detecting the linear displacement position of a piston rod and a device for effecting control on the basis of the detected data such that the cylinder will be stopped at a desired intermediate position in the cylinder stroke by a brake operation.

The operation of a conventional fluid powered cylinder is limited only to a full-stroke operation. It has recently been proposed in the art of pneumatic cylinders to stop the cylinder at a desired intermediate stroke position by employing a cylinder having a brake. An example of such prior art is shown in FIGS. 1 and 2. A cylinder 1 is provided with a brake 2. A brake cylinder 4 is actuated by changing over of a brake electromagnetic valve 3 and braking force is thereby exercised on a piston rod 5. Reference numeral 6 designates a direction control valve for switching the direction of driving the rod, 7 a pneumatic source, and 8, 9 throttle valves for controlling the drive speed. A detection section 10 for detecting a stroke position of the cylinder includes a roller 10a which is constantly in contact with the rod 5 and rotates following the linear movement of the rod 5 and an incremental encoder 10b (FIG. 2) which generates an incremental pulse in response to the rotation of this roller 10a. When the cylinder 5 is at the origin, a counter 12 is reset by an origin set switch 11 and incremental pulses provided by the encoder 10b thereafter are counted by the counter 12. The count value of the counter 12 represents the cylinder rod position. Set positions of various operations set by a setter 13 are compared with this count value in a comparison circuit 14. The comparison operation in the comparison circuit 14 and the operation of a drive circuit 16 are controlled by a sequence circuit 15. The output of the comparison circuit 14 is supplied to the drive circuit 16 whereby a drive signal for switching the direction control valve 6 and the brake valve 3 is supplied to these valves 3 and 6. For example, a desired stroke intermediate position is set by the setter 13 and when the present position of the rod 5 measured by the detection section 10 coincides with this set position, the brake valve 3 is switched to actuate the brake 2 and simultaneously the direction control valve 7 is switched to a neutral position to stop the rod 5.

Despite braking, the rod 5 does not stop instantly but an overrun takes place. In the prior art devices, not much consideration has been given to any countermeasure against overrun. In these devices, an only measure taken is to apply brake at a position which is before a desired stop position by a predetermined distance on the assumption that the amount of overrun is constant. In actuality, however, the amount of overrun differs depending upon the velocity of movement of the rod 5. In a transition period after the start of the movement of the rod 5, the amount of overrun differs also depending upon the acceleration of the movement of the rod 5. FIG. 3 shows an example of changes in velocity, acceleration and overrun amount against the amount of movement of the rod 5 with the lapse of time from the start of the movement. As will be understood from the figure, the velocity, acceleration and amount of overrun change instably in the transition period of rising despite the intended movement at a constant velocity. This instable period is, for example, of the order of 30 mm in the rising period.

In the prior art device, therefore, no brake control taking into account the amount of overrun corresponding to the velocity has been made and this has placed a limit upon the accuracy of the stop control. Further, a proper brake control is difficult in the transition period in the rising because the velocity, acceleration and overrun amount are instable and therefore cannot be estimated and hence the rod 5 cannot be stopped in this portion. This is not only because of the instability in the overrun amount but also because of the manner of starting the movement of the rod. Since in the prior art the release of the brake and the switching of the direction control valve 6 are simultaneously performed in the starting period, a rapid initial dashing of the rod 5 occurs due to an abrupt release of the brake in a state in which the drive force is being applied to the rod 5. This prevents a fine stop control in the rising period.

In a hydraulic cylinder which does not use a brake, overrun occurs similarly when the rod is to be stopped at a desired intermediate position in the cylinder stroke.

Furthermore, since in the rod position detection section 10 in the prior art device, displacement of the rod 5 is transmitted by friction between the roller 10a and the rod 5, slippage occurring between the roller 10a and the rod 5 makes an accurate detection of the position impossible and therefore adversely affects the accuracy in stopping of the rod 5.

SUMMARY OF THE INVENTION

It is an object of the present invention to provide a positioning control system for a fluid powered cylinder which has eliminated the above described disadvantages of the prior art device. More specifically, an object of the invention is to provide a cylinder position detection device capable of continuously detecting the piston rod position in a non-contacting manner. It is another object of the invention to provide a positioning control device capable of performing an accurate positioning (i.e., stop control) taking into account the change in the overrun amount corresponding to the velocity and acceleration. It is still another object of the invention to provide a positioning control device capable of performing a positioning control at any intermediate stroke position by taking into account the overrun amount in accordance with a set displacement value, i.e., the magnitude of a target value of positioning, that is, a device capable of performing an accurate positioning even if the set displacement value (target value) is an extremely small one.

A piston rod position detection device for a fluid powered cylinder according to the invention comprises a coil assembly including primary coils disposed at predetermined locations axially spaced from one another and secondary coils provided in association with these primary coils, and a, plurality of rings made of magnetic substance and provided on the rod with a predetermined axial interval therebetween. The coil assembly is fixed at one end of the cylinder in such a manner that the rod is slidably disposed through a space in these coils. As the piston rod is displaced, the rings provided thereon are displaced relative to the coils whereby reluctance of a magnetic circuit passing through each of these coils shows a specific value corresponding to a relative linear position of the rings. The primary coils are individually excited by a plurality of reference AC signals which are out of phase with one another. Outputs of the respective secondary coils induced thereby are summed together and an output signal resulting by phase shifting the reference AC signals in accordance with the relative linear position of the rod, i.e., rings, is obtained. An electrical phase difference between this phase shifted output signal and a predetermined one of the reference AC signals is detected and detected phase difference data is obtained as piston rod position data.

Another piston rod position detection device according to the invention comprises a stator including poles disposed with a predetermined interval therebetween in the circumferential direction and being respectively provided with a primary coil and a secondary coil wound thereon and projections made of magnetic substance and provided, with a predetermined axial pitch, at least on the surface of the rod opposing each of the poles in such a manner that a predetermined difference is produced in correspondence between the projections and end portions of the poles. The stator is fixed on one end of the cylinder in such a manner that the rod is slidably disposed through a space defined by the poles with a predetermined gap being formed between the rod and the poles. As the piston rod is displaced, the projections are displaced relative to the stator whereby reluctance of each of the poles shows a specific value corresponding to a relative linear position of the projections. In the same manner as previously described, the primary coils are individually excited by a plurality of AC signals which are out of phase with one another. Outputs of the respective secondary coils induced thereby are summed together and an output signal resulting by phase shifting the reference AC signals in accordance with the relative linear position of the rod is obtained. An electrical phase difference between this phase shifted output signal and a predetermined one of the reference AC signals is detected and detected phase difference data is obtained as piston rod position data.

A positioning control device for a fluid powered cylinder according to the invention detects the piston rod position by employing the above described piston rod position detection device and thereupon controls the cylinder operation by using the position detection data. More specifically, this positioning control device comprises position detection means for detecting a relative linear position of a piston rod in the cylinder, velocity detection means for detecting the velocity of movement of the rod, acceleration detection means for detecting the acceleration of movement of the rod, setting means for setting a positioning target value, determination means for determining an estimated amount of overrun by employing the detected velocity and acceleration data, compensation means for modifying at least one of the value of position data obtained by the position detection means and the positioning target value in accordance with the estimated amount of overrun determined by the determination means, comparison means for comparing the position data and the target value after the modification by the compensation means, and drive control means for controlling the movement of the cylinder in accordance with the result of comparison by the comparison means. In a case where a pneumatic cylinder having a brake is employed, the drive control means at least controls this brake. The valve switching operation and the brake control operation are performed in accordance with a result of the comparison. In a case where a hydraulic cylinder is employed, it is possible to stop the rod at a desired intermediate stroke position by only performing the valve switching operation in accordance with a result of the comparison without provision of the brake.

According to this invention, not only the overrun amount can be estimated in response to the moving velocity of the piston rod but the overrun amount can be estimated taking the acceleration into account, in view of the fact that the overrun amount is relatively strongly affected by the acceleration in the rising period as shown in FIG. 3. Thus, the estimated amount of overrun is determined taking into account the velocity and acceleration of the movement of the piston rod relative to the cylinder, the rod present position detection data or the positioning target value (the set value of displacement) is modified so as to make compensation in accordance with the estimated amount of overrun thus determined, and the movement of the cylinder is controlled on the basis of comparison of the modified (compensated) position data and the target value. For example, the rod can be accurately positioned by applying brake before the target value in accordance with the estimated amount of overrun to cause the rod to overrun by the estimated amount. By taking both velocity and acceleration into account, the overrun amount can be estimated even for an extremely small target value (such as for the rising period shown in FIG. 3) and hence positioning for such a small target value can be realized.

Further, the positioning control device according to the invention comprises means for detecting an error of an actual stop position of the cylinder relative to the target value each time the positioning control has been completed, memory means for storing offset data associated with the detected error, and data value correction means provided in a signal path including determination means, compensation means and comparison means, the offset data stored in said memory means being read out during a next positioning control and used as a correction parameter in the data value correction means to correct one or more of the estimated overrun amount, position data and target value data in accordance with the offset data. Thus, each time a single positioning has been completed, the estimated amount of overrun is corrected and the accuracy of positioning thereby is remarkably improved.

As the piston rod position detection device, a non-contacting type device as described above is preferably used for preventing an erroneous detection due to the slippage of the contacting roller, for the accuracy of the position detection device is of a vital importance in a fine positioning control.

Another factor to make a fine positioning control feasible is to minimize the amount of the starting dash of the rod. For this purpose, the brake should preferably be released first and then the direction control valve be switched to an ON position for either advance or withdrawal.

DESCRIPTION OF PREFERRED EMBODIMENTS

Figure 1:
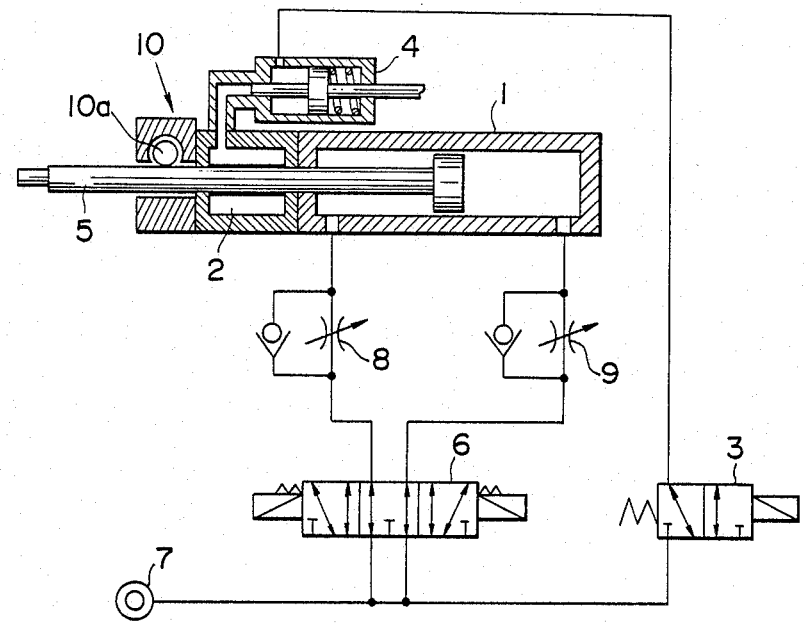
FIG. 1 is a side sectional view of a cylinder and a diagram of a fluid, circuit therefor showing a prior art positioning control device for a fluid powered cylinder with a brake.
Figure 2:
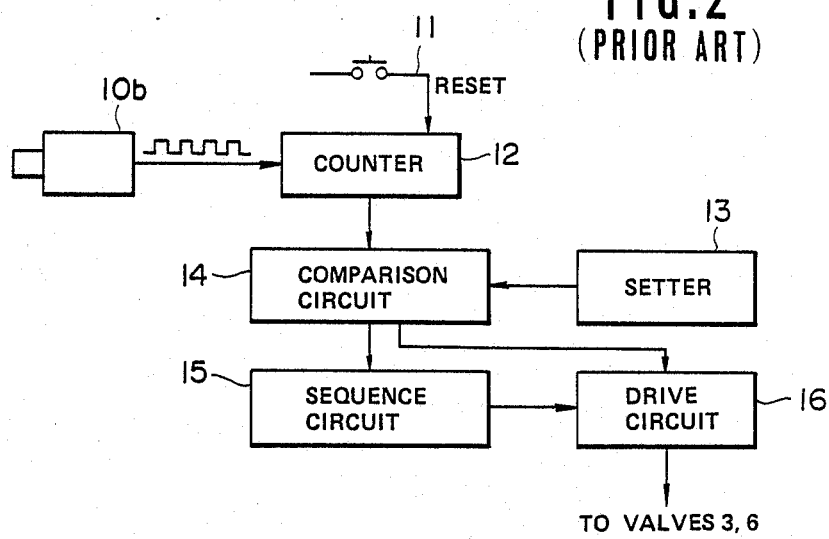
FIG. 2 is an electrical block diagram of the prior art positioning device associated with FIG. 1.
Figure 4:
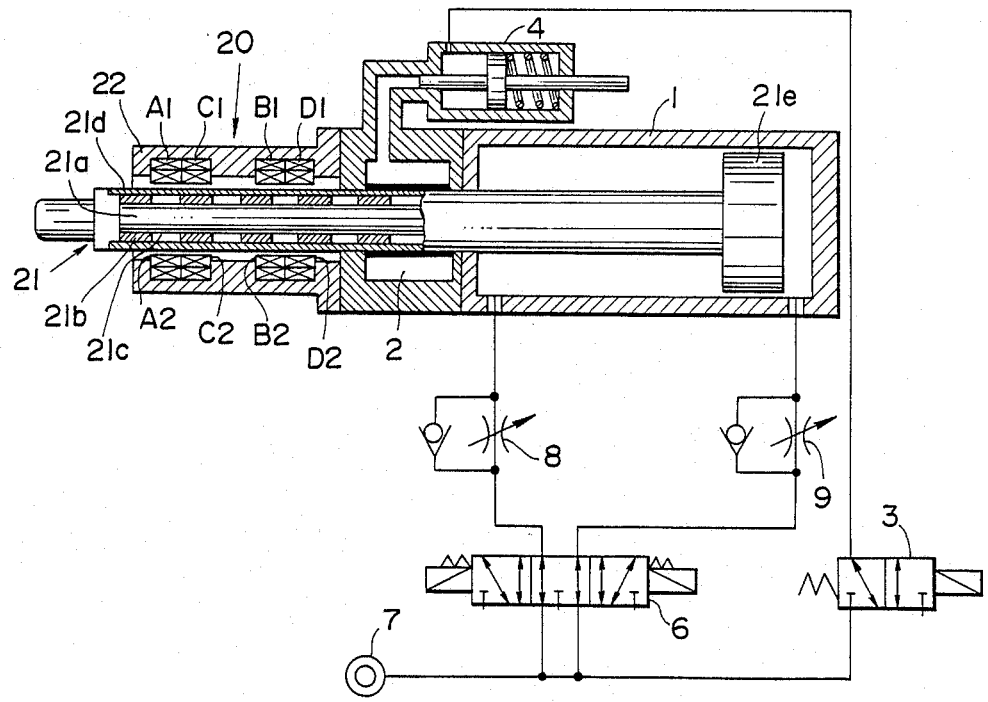
FIG. 4 is a side sectional view of a cylinder and a diagram of a fluid circuit therefor of an embodiment of the positioning control system according to the present invention.

Referring to FIG. 4, reference numerals 1-4 and 6-9 denote the same components as those in FIG. 1, i.e., reference numeral 1 designates a cylinder, 2 a brake, 3 an electromagnetic valve for the brake, 4 a cylinder for the brake, 6 a direction control valve, 7 a fluid pressure source (e.g. an air pressure source) and 8 and 9 throttle valves, respectively.

Figure 8:
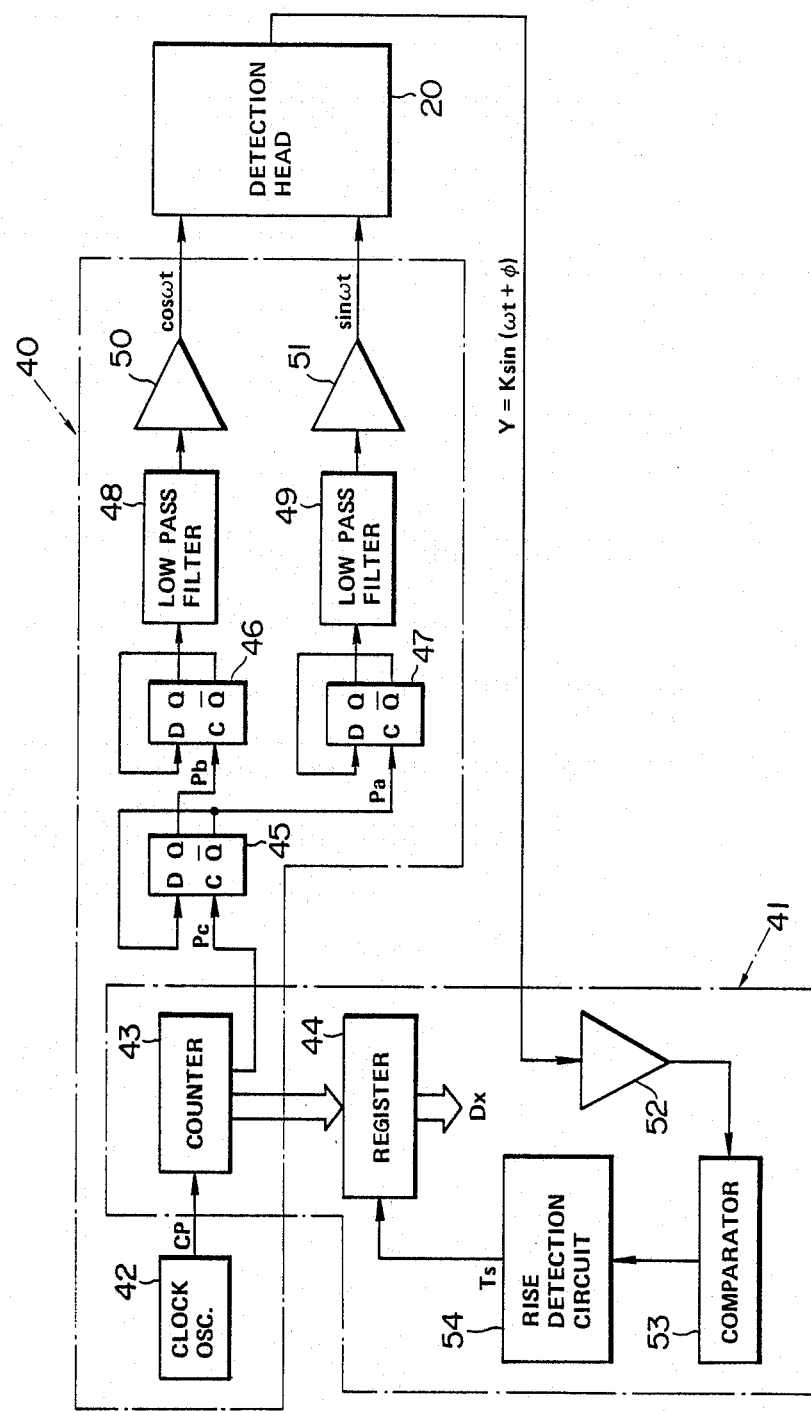
FIG. 8 is an electrical block diagram of an electrical circuit associated with the piston rod position detection device shown in FIG. 4, which corresponds to a conversion circuit shown in FIG. 5.

The piston rod position detection device will first be described. This detection device consists of a detection head 20 as shown in FIG. 4 and an electrical circuit section as shown in FIG. 8. The detection head 20 detects a relative linear position of a piston rod 21 with respect to the cylinder 1 without contacting the piston rod 21 and provides an output signal by phase-shifting an electric angle of an AC signal in response to the linear position.

The detection head 20 comprises a coil assembly in which are provided four primary coils A1-D1 and four secondary coils A2-D2 corresponding to these primary coils. This coil assembly is fixed to one end of the cylinder 1 in such a manner that the rod 21 is concentrically and slidably disposed through a hollow cylindrical space defined by these coils. The rod 21 includes a columnar core rod 21a to which a piston 21e in the clyinder 1 is fixed, annular rings 21b made of magnetic substance of a certain length and annular non-magnetic spacers 21c which are axially alternately secured about the core rod 21a and a cylindrical non-magnetic sleeve 21d which covers the outer peripheries of these rings 21b and spacers 21c. For the non-magnetic spacers 21c, a solid nonmagnetic material or air is preferably used. For example, the length of each magnetic ring 21b is "P/2" (P being any selected number) and the width of each spacer is also "P/2" and so one pitch in the alternate arrangement of the rings and spacers is "P". In the present embodiment, the coils are provided so that they will operate in four phases. These phases are conveniently designated by reference characters A, B, C and D. Reluctance produced in each of the phases A-D in response to the position of the magnetic rings 21b of the rod 21 is 90° out of phase from each adjacent phase. If, for example, the phase A is a positive cosine phase, the phase B is a positive sine phase, the phase C is a negative cosine phase and the phase D is a negative sine phase. In the embodiment of FIG. 4, the respective primary coils A1-D1 and the respective secondary coils A2-D2 are provided individually for the respective phases A-D. The length of each coil is substantially equal to the length of each magnetic ring 21b, i.e., "P/2". In the example of FIG. 4, the coils A1 and A2 of the phase A are disposed adjacent to the coils C1 and C2 of the phase C and the coils B1 and B2 of the phase B are provided adjacent to the coils D1 and D2 of the phase D. The interval between the coils of the phases A and B or between the coils of the phases C and D is "P(n±1/4)" (n being any natural number). According to the above described arrangement, the reluctance of the magnetic circuit in each of the phases A-D changes with the linear displacement of the rod 21 (more specifically, the magnetic ring 21b) and the phase of the reluctance change is different by 90° with respect to each adjacent phase (hence the phases of the reluctance change is different by 180° between the phases A and C and the phases B and D).

Figure 7:
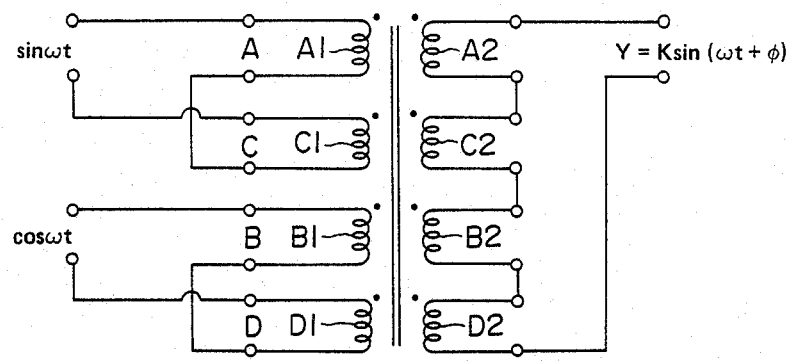
FIG. 7 is a circuit diagram showing an example of connection of the primary coils and the secondary coils of the piston rod position detection device shown in FIG. 4.

An example of connections of the primary coils A1-D1 and the secondary coils A2-D2 is shown in FIG. 7. In FIG. 7, the primary coils A1 and C1 of the phases A and C are excited in opposite phase to each other by a sine signal sin ωt whereas outputs of the secondary coils A2 and C2 are added together in the same phase. Similarly, in the phases B and D, the primary coils B1 and D1 are excited in opposite phase to each other, by a cosine signal cos ωt whereas outputs of the secondary coils B2 and D2 are added together in the same phase. The outputs of the secondary coils are ultimately added together and provided as an output signal Y. Alternatively, the connection may be made such that the primary coils A1 and C1 of the phases A and C are excited in the same phase by the sine signal sin ωt, the secondary coils A2 and C2 are connected in opposite phase to each other, the primary coils B1 and D1 of the phases B and D are excited in the same phase by the cosine signal cos ωt, the secondary coils B2 and D2 are connected in opposite phase to each other and the outputs of the secondary coils are added together.

The output signal Y of the detection head 20 is equivalent to a signal obtained by phase-shifting a reference AC signal (sin ωt or cos ωt) by a phase angle φ which corresponds to the linear position of the magnetic rings 21b of the rod 21 as shown in the following equation, for the reluctance of each phase (A, B, C or D) is out of phase by 90° from its adjacent phase and the exciting signal of one pair (A and C) is out of phase by 90° from the exciting signal of the other pair (B and D):

$$Y = K \sin(\omega t + \phi)$$

where K is a constant determined on the basis of several conditions. By measuring the phase difference φ corresponding to the reference signal sin ωt of the output signal Y expressed in the above equation, the position of the rod 21 can be detected.

The amount of displacement of the rod 21 when the amount φ of phase difference is the entire angle 2π corresponds to 1 pitch P of the magnetic rings 21b. In other words, according to the amount φ of the electrical phase difference in the signal Y, an absolute linear position within the distance P can be detected. If an absolute linear position beyond the distance P is to be detected, such position can be detected by providing additionally a suitable means (the accuracy of detection of this additional means may be a rough one using the distance P for unit) to obtain absolute addresses of the individual magnetic rings 21b of the rod 21 and employing combinations of these absolute addresses and the detected values of the linear position based on the phase difference $\phi$. According to the measurement of the electrical phase difference $\phi$, the absolute linear position within the distance P can be obtained with a high resolution.

Means for obtaining the phase difference $\phi$ between the output signal Y and the reference AC signal sin $\omega t$ (or cos $\omega t$) may be suitably constructed. FIG. 8 shows an example of such circuit in which the phase difference $\phi$ is obtained in a digital value. Though not shown in the figure, the phase difference $\phi$ may also be obtained in an analog value by employing an integration circuit to compute a time difference at a predetermined phase angle (e.g. 0 degree) between the reference AC signal sin $\omega t$ and the output signal Y=K sin($\omega t + \phi$).

In FIG. 8, a reference AC signal generation circuit 40 is a circuit for generating a reference AC sine signal sin $\omega t$ and a reference AC cosine signal cos $\omega t$ and a phase difference detection circuit 41 is a circuit for measuring the phase difference $\phi$. A clock pulse CP generated by a clock oscillator 42 is counted by a counter 43. The counter 43 is of a modulo M and its count is provided to a register 44. A pulse Pc which is obtained by 4/M frequency-dividing the clock pulse CP is delivered from a 4/M frequency divided output of the counter 43 and supplied to a C-input of a ½ frequency-dividing flip-flop 45. A pulse Pb provided from a Q output of the flip-flop 45 is applied to a flip-flop 46 and a pulse Pa provided from a Q output of the flip-flop 45 is applied to a flip-flop 47. Output signals of these flip-flops 46 and 47 are processed through low-pass filters 48, 49 and amplifiers 50, 51 whereby the cosine signal cos $\omega t$ and the sine signal sin $\omega t$ are obtained. M counts in the counter 43 corresponds to the phase angle of $2\pi$ radian of these reference signals cos $\omega t$ and sin $\omega t$. In other words, 1 count in the counter 43 represents a phase angle of $2\pi/M$ radian.

The output signal Y of the detection head 20 is applied to a comparator 53 through an amplifier 52 and a square wave signal corresponding to the positive or negative polarity of the signal Y is provided by the comparator 53. A rise detection circuit 54 produces a pulse Ts in response to the rise of the output signal of the comparator 53 and the count value of the counter 43 is loaded in the register 44 in response to this pulse Ts. As a result, a digital value Dx corresponding to the phase difference $\phi$ is loaded in the register 44.

Figure 9:
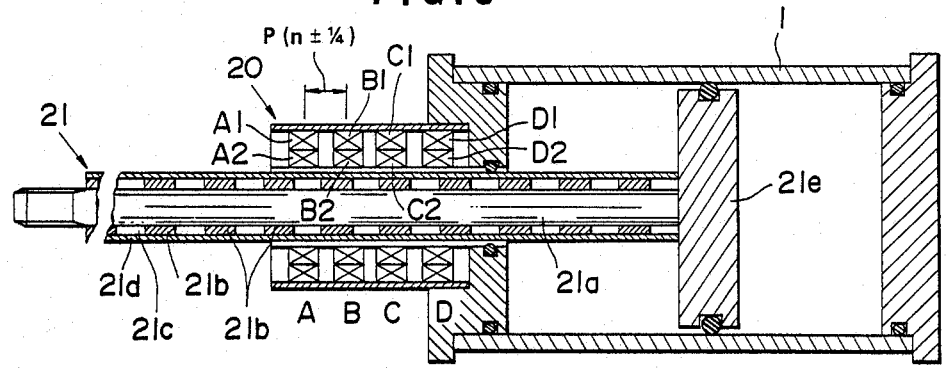
FIGS. 9, 10, 11A and 12 are side sectional views respectively showing other embodiments of the piston rod detection devices according to the invention.
Figure 10:
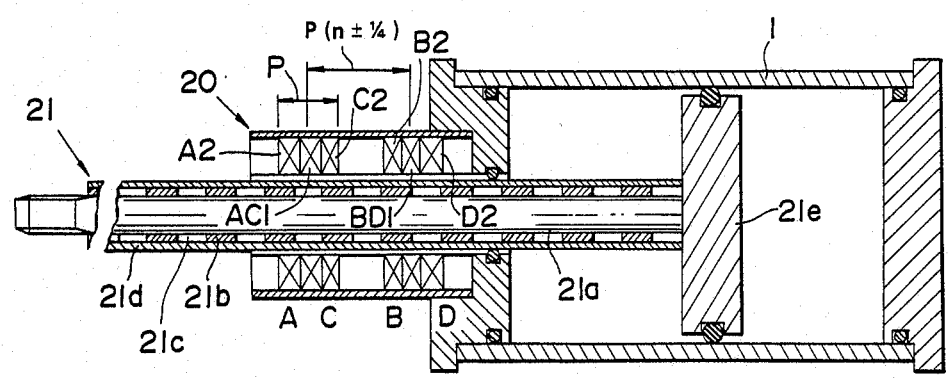

The arrangement of the phases A-D is not limited to the above described one but, as shown in FIG. 9, the respective coils A1-D1 and A2-D2 may be provided with a predetermined interval "(n±¼)" in the order of the phases A, B, C and D. Alternatively, each of the primary coils A1-D1 and each of the secondary coils A2-D2 of the respective phases may be wound together in the bifiler winding. Alternatively again, as shown in FIG. 10, a primary coil (or secondary coil) AC1 may be provided commonly for the phases A and C and the secondary coils (or primary coils) A2 and C2 may be connected in opposite phase to each other. Similarly, a primary coil BD1 may be provided commonly for the phases B and D and the secondary coils B2 and D2 may be connected in opposite phase to each other. For the sake of convenience, illustration of the brake 2 and the fluid pressure circuit is omitted in FIGS. 9 and 10.

The phases A and C, or B and D, which form the pair contribute to deepening the output signal level differentially and thereby improving the accuracy of detection. If the accuracy is not required, the coils of the phases C and D may be omitted. The number of the coils (pairs) is not limited to four pairs or 2 pairs but may be more.

In FIGS. 4, 9 and 10, the core 21a of the rod 21 may be made of either a magnetic substance or a non-magnetic substance. The core made of non-magnetic substance is preferable in respect of accuracy. If the core 21a of the rod 21 is made of a magnetic material, this core may be formed in the outer peripheral portion thereof with annular projections with an axially predetermined length and interval, which annular projections constitute the magnetic rings 21b. Even in this case, it is desirable to provide the non-magnetic sleeve 21d on the outer periphery of the annular projections for ensuring a smooth sliding of the rod 21.

Figures 11A, 11B:
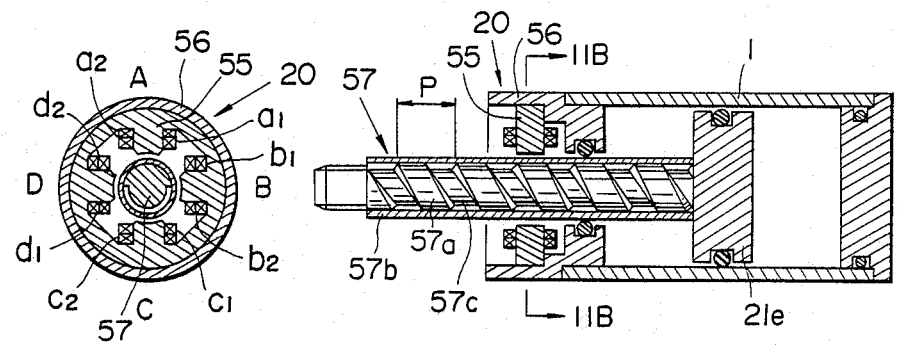
FIG. 11B is a sectional view taken along lines 11B—11B in FIG. 11A.

FIGS. 11A and 11B show another embodiment of the invention. For convenience of illustration, the brake 2 and the fluid pressure circuit are not shown. The detection head 20 comprises a stator core 55 of a magnetic substance which consists of four magnetic poles A, B, C and D arranged in the circumferential direction with an interval of 90°. On these magnetic poles A-D of the stator core 55 are wound primary coils a1-d1 and secondary coils a2-d2. The stator core 55 is received in a casing 56 and fixed to one end of the cylinder 1 in such a manner that a piston rod 57 of the cylinder 1 is concentrically and slidably disposed through a central space of the stator core 55. The rod 57 includes a core of a magnetic material provided with a helical projection 57a of a predetermined pitch. One end of the rod 57 is secured to a piston 21e in the cylinder 1. To the outer periphery of the rod 57 is provided a cylindrical sleeve 57b to ensure a smooth sliding of the rod 57.

The length of 1 pitch of the helical projection 57a is designated by P and the width of the projection 57a is substantially equal to the width of a groove 57c. The axial length of the end portion of each of the poles A-D of the stator 55 is substantially equal to the width of the helical projection 57a. This construction enables the reluctance of the gaps between the rod 57 and the respective poles A-D of the stator 55 to change in response to the linear position of the rod 57 with the phase of the change differing by 90° from each adjacent pole. If, for example, the reluctance change of the pole A is positive cosine, that of the pole B is positive sine, that of the pole C is negative cosine and that of the pole D is negative sine and the reluctance of the diametrically opposed poles A and C, or B and D, changes differentially in response to the displacement of the rod 57, completing 1 cycle with 1 pitch of the helical projection 57a.

The connection of the primary coils a1-d1 and the secondary coils a2-d2 in the stator 55 is made in the same manner as in the embodiment of FIG. 7. More specifically, the primary coils a1 and c1 of the poles A and C are excited in opposite phase to each other by the sine signal sin $\omega t$ and the primary coils b1 and d1 of the poles B and D in opposite phase to each other by the cosine signal cos $\omega t$. The secondary coils a2, c2 of the poles A and C and the secondary coils b2, d2 of the poles B and D are connected in the same phase and outputs thereof are added together to provide an output signal Y. In this arrangement, the pair of the poles A and C and the other pair of the poles B and D in which reluctance changes differentially are individually excited by the two reference AC signals (sin ωt and cos ωt) having an electrical phase difference corresponding to the phase difference (i.e. 90°) in the reluctance change between the two pairs. As a result, an output signal Y which is equivalent to the reference AC signal which has been phase-shifted by the phase angle φ corresponding to the linear position of the rod 57 is obtained. The electrical phase difference between this output signal Y and the reference AC signal sin ωt or cos ωt can be measured in digital by employing the circuit shown in FIG. 8 in the same manner as has previously been described.

Figure 12:
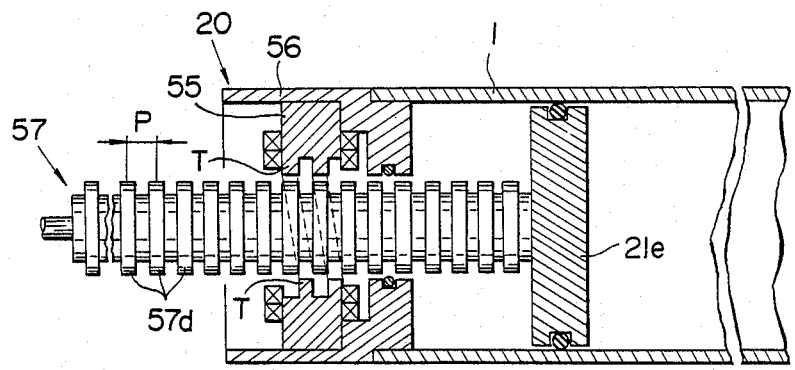

The configurations of the stator core 55 and the helical projection 57a of the rod 57 may be suitably changed. For example, the number of the stator core 55 is not limited to four but any suitable number may be adopted. The projection formed on the rod 57 is not limited to be of a continuous helical shape but may be one which is generally helical and projecting only at locations corresponding to the poles A-D. Alternatively, as shown in FIG. 12, annular projections 57d may be provided axially on the rod 57 with a predetermined pitch and teeth T of the poles A-D of the stator may be axially offset in a helical form so that the same effect as the helical projection on the rod 57 may be obtained. Further, a non-magnetic material may be filled in the groove formed in the rod 57 so as to smooth the outer peripheral surface of the rod.

Figure 5:
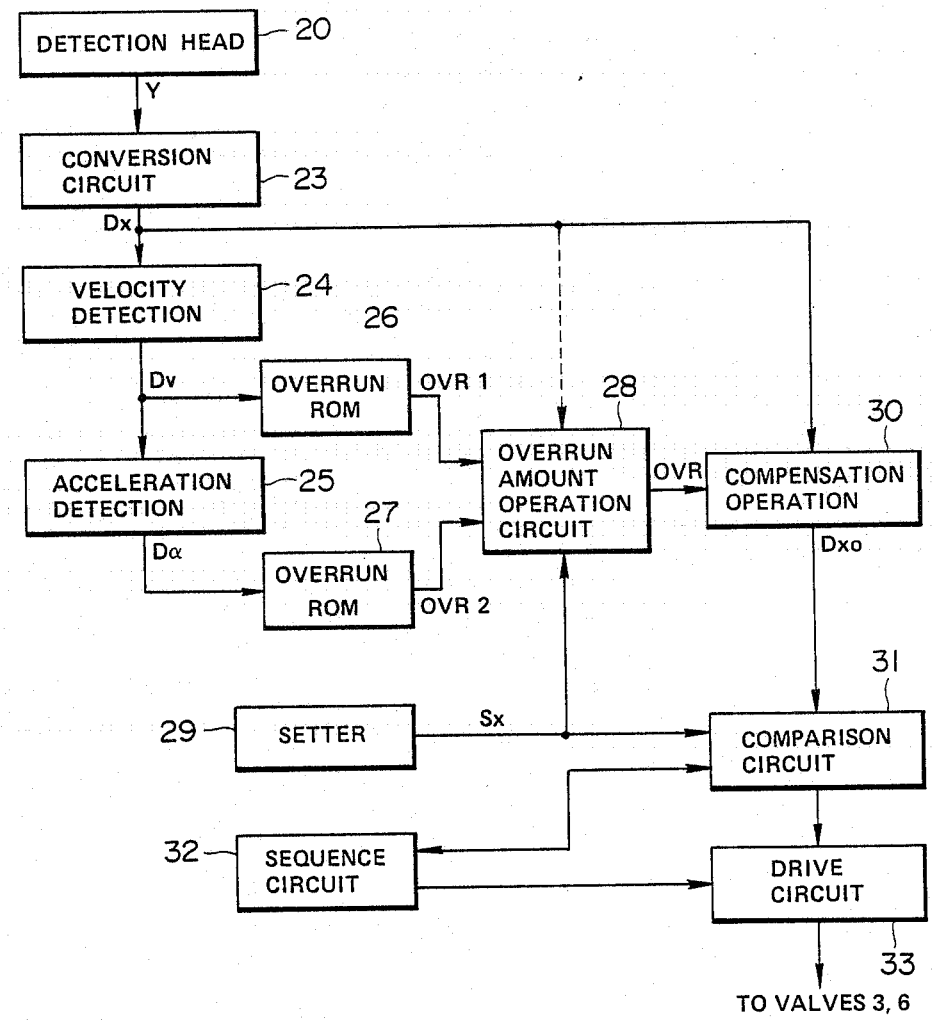
FIG. 5 is an electrical block diagram associated with the embodiment of the positioning control system shown in FIG. 4.

Referring now to FIGS. 4 and 5, the cylinder positioning control will be described in detail.

In FIG. 5, the output signal Y of the detection head 20 is supplied to a conversion circuit 23 where the amount of the electrical phase difference φ is measured. The measured value is provided as data Dx representing the present position of the rod 21 (i.e., cylinder stroke position). The conversion circuit 23 corresponds to the circuit shown in FIG. 8. As the detection head 20, any of the constructions shown in FIGS. 4, 9, 10, 11A, 11B and 12 may be employed. A velocity detection circuit 24 and an acceleration detection circuit 25 are provided for detecting the velocity and acceleration of the movement of the rod 21. In this embodiment, no special sensors for detecting the velocity and acceleration are provided but the velocity is detected by utilizing the rod position detection data Dx and the acceleration is detected by utilizing velocity data Dv of the detected velocity. For this purpose, the position data Dx is applied to the velocity detection circuit 24 and the velocity data Dv delivered from the velocity detection circuit 24 is applied to the acceleration detection circuit 25.

When the rod 21 is at a standstill at a desired position, the position data Dx maintains a value representing this position and no change is brought about. When the rod 21 is moving at a certain velocity, the value of the position data Dx changes with time in response to the change of the rod position. Accordingly, the velocity data Dv can be obtained by operating the amount of change of the position data Dx per predetermined unit time (or unit period) in the velocity detection circuit 24. Likewise, acceleration data Da can be obtained by operating the amount of the velocity data Dv per predetermined unit time (or unit period) in the acceleration detection circuit 25.

Figure 3:
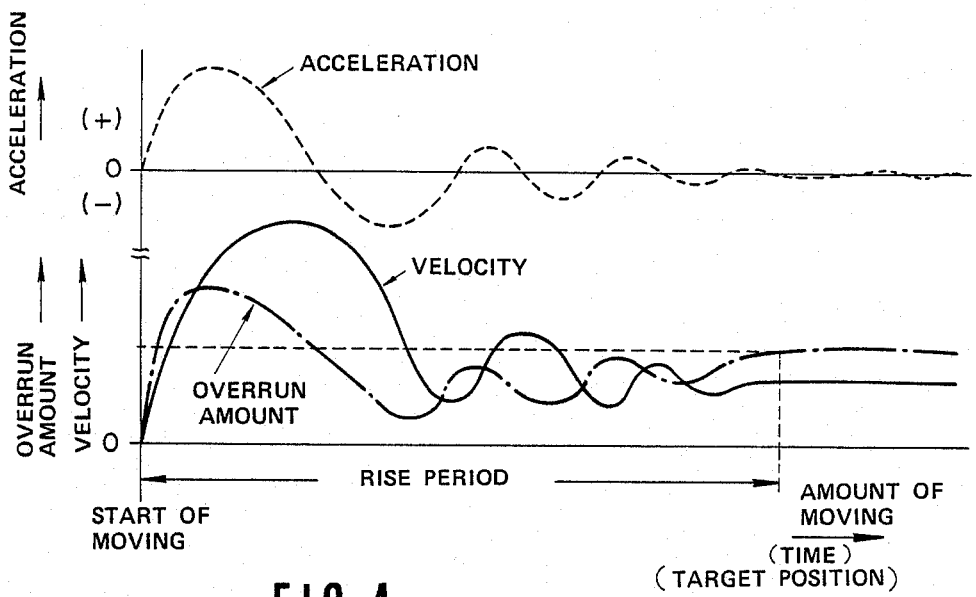
FIG. 3 is a graphical diagram showing an example of properties of the velocity, acceleration and overrun amount corresponding to the amount of displacement (set displacement amount) of a pneumatic cylinder.

An overrun ROM (or RAM) 26 prestores the amounts of overrun corresponding to various velocity values. Similarly, an overrun ROM (or RAM) 27 prestores the amounts of overrun corresponding to various acceleration values. ROM herein means a read-only memory and RAM a random-access memory. The "amount of overrun" means a distance between a position at which the brake 2 starts its operation and a position at which the rod 21 actually stops. The amounts of overrun are previously measured (learned) in correspondence to various velocity and acceleration values and stored in the ROM's (or RAM's) 26 and 27. For example, as shown in FIG. 3, the amount of overrun is determined depending substantially upon acceleration (mixed to some extent with velocity) when acceleration is involved (i.e., during the rise period). In the constant velocity period, the amount of overrun is determined depending substantially upon the velocity. Hence, not only velocity and acceleration but the position at which the rod is to be stopped, i.e., a set amount of movement of the rod, is an important factor in estimating the amount of overrun.

Overrun amount data OVR1 and OVR2 respectively read from the ROM 26 and 27 in response to the present velocity data Dv and the present acceleration data Da are supplied to an overrun amount operation circuit 28. The overrun amount operation circuit 28 provides, by a series of operation including computation, selection and mixing, data OVR estimating an actual overrun amount using expected overrun amount data OVR1 corresponding to the present velocity, expected overrun amount data OVR2 corresponding to the present acceleration and a set displacement value (target value) Sx set by a setter 29 as parameters. For example, the operation circuit 28 selects the overrun amount data OVR2 corresponding to the acceleration as the data OVR when the set displacement value Sx belongs to a predetermined rise period whereas it selects the overrun amount data OVR1 corresponding to the velocity as the data OVR when the valve Sx does not belong to the rise period. For another example, the operation circuit 28 mixes the data OVR2 corresponding to the acceleration and the data OVR1 corresponding to the velocity at a predetermined ratio corresponding to the set displacement value Sx and provides this mixed data as the overrun data OVR. In this case, a memory may preferably be provided additionally for reading out data for the data OVR1 and OVR2 in response to the set displacement value Sx. For still another example, the larger one of the data OVR1 corresponding to the velocity and the data OVR2 corresponding to the acceleration may be selected as the overrun amount data OVR. For still another example, the operation circuit 28 may comprise a memory for reading out an expected overrun amount in correspondence to the set displacement value Sx and provide data read from this memory as the data OVR after suitably increasing or decreasing it in accordance with data OVR1 and OVR2. In all of the above described examples, the set displacement value Sx may be replaced by time data (or position data Dx) from the start of the movement of the rod till the present time. In all of the above described examples, the set displacement value Sx may be an absolute value from the origin or a value representing an amount of displacement from any suitable point of start of the movement.

A compensation operation circuit 30 increases or decreases the value of the position data Dx in response to the overrun amount established data OVR and changes the position data Dx to a value DxO which has compensated the estimated overrun amount. A comparison circuit 31 compares the compensated position data DxO and the set displacement value Sx set by the setter 29 together. The timing and conditions of comparison are controlled according to an overall sequence operation of the cylinder 1 by a sequence circuit 32. The output of the comparison circuit 31 is supplied to a drive circuit 33 and the switching driving of the direction control valve 6 and the brake valve 3 are thereby performed in accordance with the result of the comparison.

Assuming, for example, that the set displacement value Sx is 5 mm and that the estimated overrun amount data OVR which has been determined by the velocity, the acceleration and the set value Sx is −2 mm when the present position data Dx is 3 mm, the compensated position data DxO becomes 5 mm and a coincidence output thereupon is produced from the comparison circuit 31 and the brake 2 is operated. An overrun of about 2 mm from this brake timing is produced whereby the rod 21 stops at the desired 5 mm position. Since the brake control is performed taking into account the velocity, the acceleration and the set displacement value, a small distance (e.g. several mm to several 10 mm) within the rise period (see FIG. 3) can be set as the set displacement value Sx where the rod 21 stops accurately.

The sequence circuit 32 effects control such that the switching timing of the direction control valve 6 and the brake valve 3 is slightly offset so as to minimize an amount of initial dashing of the rod 21 when the rod 21 starts movement. More specifically, the brake valve 3 is first switched to release the brake 2 and thereafter the direction control valve 6 is switched to an ON position for a forward or backward movement to start the movement of the rod 21. By this arrangement, the reaction of the brake 2 is prevented at the start of the movement of the rod 21 whereby the rod 21 starts to move relatively smoothly and the initial dashing is reduced to the minimum. By reducing the amount of initial dashing, the region in which stopping of the rod 21 can be controlled in the rise period is increased and a smaller set value Sx can be realized.

In the compensation operation circuit 30, the set displacement value (target value) Sx may be increased or decreased for compensation (e.g., decreasing by the amount of the estimated overrun). An equivalent overrun compensation effect may also be achieved by compensating both the present position data Dx and the target value Sx by suitable amounts.

Relationships between the velocity and acceleration and the actual amount of overrun may become different from the one stored in the overrun ROM's (or RAM's) 26 and 27 due to change in the load of the cylinder, aging or other reasons. If the contents of storage in the overrun ROM's 26 and 27 come to include error, it will become difficult to perform an accurate positioning control by the above described construction alone. This problem can be overcome by memorizing each time an error between the actual stop position determined according to the invention and the set position (target position) at that time, modifying the estimated overrun amount OVR (or OVR1, OVR2, Dx0) by using a newest one of such error in a next positioning control, and effecting the compensation operation of the position data Dx0 by using the modified estimated overrun amount. Such modification of the estimated overrun amount may be realized by modifying a part of the embodiment of FIG. 5 as shown in FIG. 6.

Figure 6:
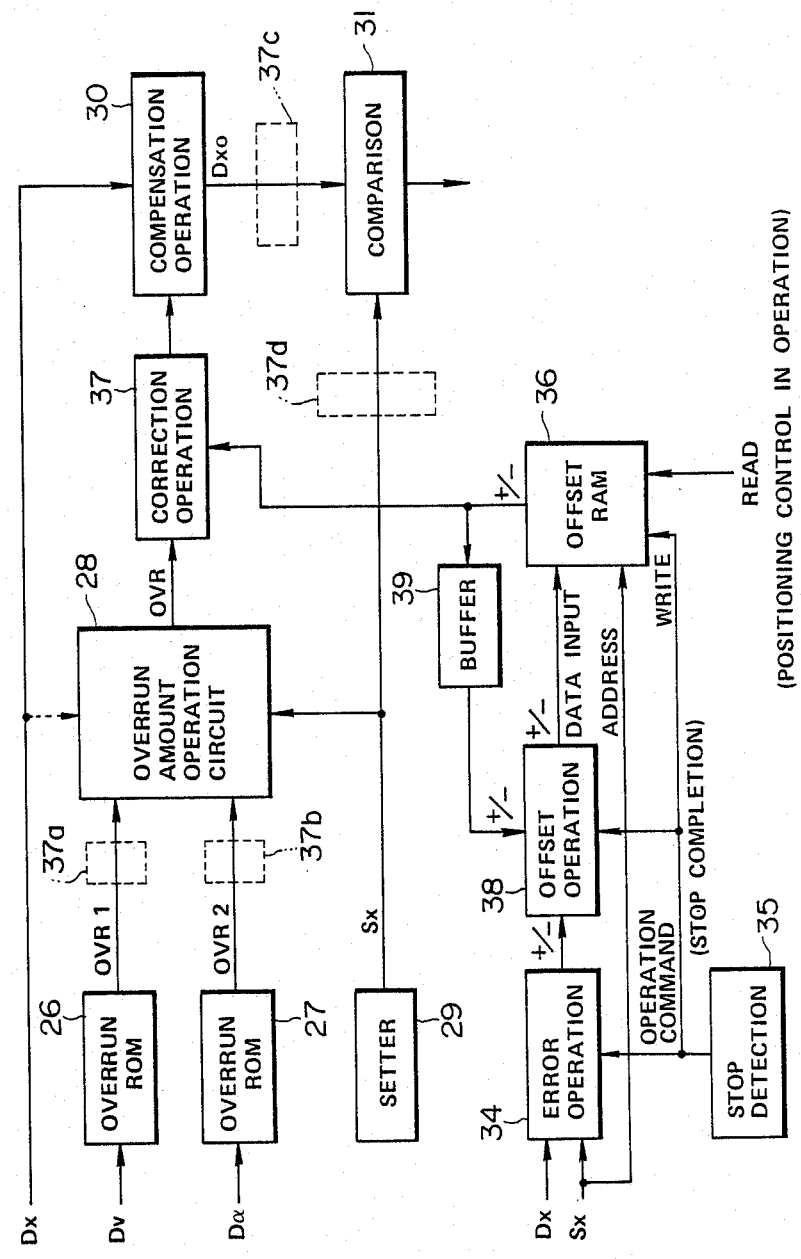
FIG. 6 is an electrical block diagram showing another embodiment of the invention in respect of modified portions in FIG. 5.

In FIG. 6, an error operation circuit 34 compares the actual stop position (represented by Dx) which has been position-controlled with the stop position set value Sx when the piston rod 21 of the cylinder 1 has come to a complete standstill after the stop control (i.e., brake control) and thereby obtains an error between them with a positive or negative sign affixed thereto. A stop detection circuit 35 detects the complete stopping of the rod 21 which has so far been moving and thereupon provides the error operation circuit 34 with an operation command. This detection can be made in a suitable manner, e.g., on the basis of reduction of the velocity data Dv to zero or lapse of a certain period of time after the start of operation of the brake 2. The error operation circuit 34 operates difference between the present position data Dx and the set value Sx in response to the operation command and supplies the result of the operation as error data to one input of an offset operation circuit 38. To another input of the offset operation circuit 38 is applied, through a buffer register 39, offset data (with a positive or negative sign) used in the stop positioning control which has been just implemented. The offset operation circuit 38 increases or decreases the value of this offset data in response to the value of the error data from the circuit 34. The operation circuit 38 is enabled to conduct the operation, similarly to the operation circuit 34, by an operation command from the circuit 35. The offset data provided by the offset operation circuit 38 is applied to a data input of a RAM (a memory capable of both reading and writing) 36. An address input of the RAM 36 receives the set value (target value) Sx and a write command input of the RAM 36 receives the same data as the operation command given from the stop detection circuit 35 to the circuits 34 and 38. Accordingly, the offset data relating to the error between the actual stop position and the set position obtained by the circuit 34 at the completion of the cylinder stop positioning is loaded in the address corresponding to the set position in the RAM 36. If the positioning is accurate, the error data provided by the operation circuit 34 is zero so that the offset data provided by the operation circuit 38 to the RAM 36 is the same as the one provided by the buffer 39. If there is an error in the positioning, the output error data of the circuit 34 has a positive or negative value corresponding to this error and the value of the old offset data is changed (increased or decreased) according to the error data.

The buffer register 39 temporarily stores the offset data read from the RAM 36. This storage is held until at least the error and offset operations in the operation circuits 34 and 38 have been completed.

The RAM 36 is adapted to be in a read-out mode during the positioning control and a read-out command is given by a suitable circuit, e.g., the sequence circuit 32 during the positioning control. Accordingly, the offset data is read from the address corresponding to the target position Sx which has been set in the positioning control under operation. The offset data thus read out is one which has been obtained and stored in the above described manner in response to the result of the last positioning with respect to the target set position of the same value as the presently applied target set position Sx. It is therefore the best offset data that reflects the present load condition or operation condition of the cylinder 1 to the maximum extent possible. Thus, the offset data which has been read from the RAM 36 signifies a great possibility that an error which is of the same or nearly same value as this offset data will be produced between the set position Sx and the actual stop position if an additional compensation (advancing or delaying the position data Dx) corresponding to this offset data is not conducted in the present positioning control.

A correction operation circuit 37 is provided between the overrun amount operation circuit 28 and the compensation operation circuit 30. This circuit 37 corrects the value of the estimated overrun amount OVR from the circuit 28 in response to the newest offset data provided by the RAM 36 during the positioning control and thereupon supplies the estimated overrun amount which has been thus corrected to the compensation operation circuit 30. This correction operation is effected by, for example, adding or subtracting the newest offset data from the RAM 36 to or from the estimated overrun amount OVR from the circuit 28. As described above, the offset data stored in the RAM 36 corresponds to the newest available data concerning the amount of change in the load and other conditions of the cylinder 1 relative to these conditions prevailing at the time when the tables of the overrun ROM's (or RAM's) 26 and 27 corresponding to the velocity and acceleration are prepared. By the above described correction, therefore, an estimated overrun amount in which the amount of change in these conditions of the cylinder 1 is cancelled can be obtained. By effecting the advancing or delaying compensation for the position data Dx which is similar to the one made in the embodiment of FIG. 5 by employing the estimated overrun amount which has been thus corrected, the present invention can be carried out while compensating the change in the cylinder conditions.

The offset data supplied from the RAM 36 to the buffer register 39 is not used while the above described correction and compensation operations are performed, i.e., during the positioning control, but is used in the offset operation circuit 38 in the manner described previously for changing the offset value in response to the positioning error after completion of the stop positioning.

The same effect will be achieved if the correction operation circuit 37 is inserted in any of locations marked by blocks 37a, 37b, 37c and 37d drawn in dotted lines.

What is claimed is:

1. A positioning control device for a fluid powered cylinder comprising:
   position detection means for detecting a relative linear position of a piston rod in said cylinder;
   velocity detection means for detecting the velocity of movement of said rod;
   acceleration detection means for detecting the acceleration of movement of said rod;
   setting means for setting a positioning target value;
   determination means for determining an estimated amount of overrun by employing the detected velocity and acceleration data;
   compensation means for modifying at least one of the value of position data obtained by said position detection means and the positioning target value in accordance with the estimated amount of overrun determined by said determination means;
   comparison means for comparing the position data and the target value after the modification by said compensation means; and
   drive control means for controlling the movement of said cylinder in accordance with the result of comparison by said comparison means.

2. A positioning control device as defined in claim 1 wherein said cylinder is provided with a brake and said drive control means controls at least said brake.

3. A positioning control device as defined in claim 1 wherein said determination means comprises:
   a first memory device for prestoring amounts of overrun corresponding to various velocities and provides first overrun amount data in response to the detected velocity;
   a second memory device for prestoring amounts of overrun corresponding to various accelerations and provides second overrun amount data in response to the detected acceleration; and
   an operation circuit for determining the estimated amount of overrun by a predetermined operation employing said first and second overrun amount data.

4. A positioning control device as defined in claim 3 wherein said operation circuit obtains the estimated overrun amount by adding or subtracting the first and second overrun amount data at a predetermined ratio in accordance with the target value set by said setting means.

5. A positioning control device as defined in claim 3 wherein said operation circuit selects the second overrun amount data when the target value set by setting means corresponds to a relatively short amount of displacement within a predetermined range and selects the first overrun amount data when the target value does not corresponds to that amount, thereby determining the estimated overrun amount in accordance with the selected data.

6. A positioning control device as defined in claim 1 wherein said drive control means controls the movement of said cylinder in accordance with the result of comparison to position said cylinder to a position corresponding to the target value and wherein said device further comprises:
   means for detecting an error of an actual stop position of said cylinder relative to the target value each time the positioning control has been completed;
   memory means for storing offset data associated with the detected error; and
   data value correction means provided in one or more of signal paths including said determination means, compensation means and comparison means,
   the offset data stored in said memory means being read out during a next positioning control and used as a correction parameter in said data value correction means to correct one or more of the estimated overrun amount, position data and target value data in accordance with the offset data.

7. A positioning control device as defined in claim 6 wherein said memory means stores the offset data using the target value as address data and the offset data is read from said memory means during the next positioning control using the target value set for the next positioning control as address data.

8. A positioning control device as defined in claim 6 wherein said position detection means comprises:
   a coil assembly including primary coils disposed at predetermined locations axially spaced from one another and secondary coils provided in association with said primary coils, said coil assembly being fixed at one end of said cylinder in such a manner that said rod is slidably disposed through a space in said primary and secondary coils;

a plurality of rings made of magnetic substance and provided on said rod with a predetermined axial interval therebetween;

a circuit for exciting each of said primary coils with one of reference AC signals which are out of phase with one another;

a circuit for summing outputs of said secondary coils and thereby producing an output signal resulting by phase shifting the reference AC signals in accordance with a relative linear position of said rod; and a circuit for detecting a phase difference between a predetermined one of the reference AC signal and the output signal of said summing circuit to obtain detected phase difference data as piston rod position data, and wherein said velocity detection means uses the piston rod position data thus obtained to operate the velocity from timewise increase or decrease of the value of this position data and said acceleration detection means operates the acceleration from timewise increase or decrease of the value of the velocity data obtained by said velocity detection means.

9. A positioning control device as defined in claim 6 wherein said position detection means comprises:

a stator including poles disposed with a predetermined interval therebetween in the circumferential direction and being respectively provided with a primary coil and a secondary coil wound thereon, said stator being fixed on one end of said cylinder in such a manner that said rod is slidably disposed through a space defined by said poles with a predetermined gap being formed between said rod and said poles;

projections provided, with a predetermined axial pitch, at least on the surface of said rod opposing each of said poles in such a manner that a predetermined difference is produced among said poles in the corresponding relationship between said projections and end portions of said poles, said rod being made of magnetic substance;

a circuit for exciting each of said primary coils with one of reference AC signals which are out of phase with adjacent poles by a predetermined electrical angle;

a circuit for summing outputs of said secondary coils and thereby generating an output signal resulting by phase shifting the reference AC signals in accordance with a relative linear position of said rod; and a circuit for detecting a phase difference between a predetermined one of the reference AC signal and the output signal of said summing circuit to obtain detected phase difference data as piston rod position data, and wherein said velocity detection means uses the piston rod position data thus obtained to operate the velocity from timewise increase or decrease of the value of this position data and said acceleration detection means operates the acceleration from timewise increase or decrease of the value of the velocity data obtained by said velocity detection means.

10. A positioning control device as defined in claim 1 which further comprises means for effecting control at the starting of movement of said cylinder so that said brake is released prior to change of a direction control valve for said cylinder.

11. A positioning control device as defined in claim 1 wherein said cylinder is a pneumatic cylinder.

12. A positioning control device for a fluid powered cylinder comprising:

position detection means for detecting a linear position of a piston rod in said cylinder;

velocity detection means for detecting the velocity of movement of said rod;

setting means for setting a positioning target value;

determination means for determining an estimated amount of overrun by employing the detected velocity data;

compensation means for modifying at least one of the value of position data obtained by said position detection means and the positioning target value in accordance with the estimated amount of overrun determined by said determination means;

comparison means for comparing the position data and the target value after the modification by said compensation means; and drive control means for controlling the movement of said cylinder in accordance with the result of comparison by said comparison means.

13. A positioning control device as defined in claim 12 wherein said determination means comprises a memory device for storing amounts of overrun corresponding to various velocities and provides overrun amount data in response to the detected velocity.

14. A positioning control device as defined in claim 12 which further comprises:

means for detecting an error of an actual stop position of said rod relative to the target value each time the positioning control has been completed;

memory means for storing offset data associated with the detected error, said offset data being read out for a next positioning control; and correction means for correcting said estimated amount of overrun to be determined in said determination means by using the read out offset data as a parameter.

15. A positioning control device as defined in claim 12, wherein said position detection means comprises:

a coil assembly including primary coils disposed at predetermined locations axially spaced from one another and secondary coils provided in association with said primary coils, said coil assembly being fixed at one end of said cylinder in such a manner that said rod is slidably disposed through a space in said primary and secondary coils;

a plurality of rings made of magnetic substance and provided on said rod with a predetermined axial interval therebetween;

a circuit for exciting each of said primary coils with one of reference AC signals which are out of phase with one another;

a circuit for summing outputs of said secondary coils and thereby producing an output signal resulting by said phase shifting the reference AC signals in accordance with a relative linear position of said rod; and a circuit for detecting a phase difference between a predetermined one of the reference AC signal and the output signal of said summing circuit to obtain detected phase difference data as piston rod position data.

16. A positioning control device as defined in claim 15 wherein said velocity detection means operates the velocity from timewise increase or decrease of the value of the position data detected by said position detection means.

17. A positioning control device as defined in claim 12 wherein said position detection means comprises:
a stator including poles disposed with a predetermined interval therebetween in the circumferential direction and being respectively provided with a primary coil and a secondary coil wound thereon, said stator being fixed on one end of said cylinder in such a manner that said rod is slidably disposed through a space defined by said poles with a predetermined gap being formed between said rod and said poles;
projection provided, with a predetermined axial pitch, at least on the surface of said rod opposing each of said poles in such a manner that a predetermined difference is produced among said poles in the corresponding relationship between said projections and end portions of said poles, said rod being made of magnetic substance;
a circuit for exciting each of said primary coils with one of reference AC signals which are out of phase with adjacent poles by a predetermined electrical angle;
a circuit for summing outputs of said secondary coils and thereby generating an output signal resulting by phase shifting the reference AC signals in accordance with a relative linear position of said rod; and
a circuit for detecting a phase difference between a predetermined one of the reference AC signal and the output signal of said summing circuit to obtain detected phase difference data as piston rod position data.

18. A positioning control device as defined in claim 17 wherein said velocity detection means operates the velocity from timewise increase or decrease of the value of the position data detected by said position detection means.

19. A position control device for a fluid powered cylinder comprising:
position detection means for detecting a linear position of a piston rod in said cylinder;
setting means for setting a positioning target value;
control means for supplying a stop command to said rod in accordance with relationship between position data detected by said position detection means and said positioning target value; and
learning means for detecting an error of an actual stop position of said rod relative to the target value when positioning for stopping said rod has been completed in response to said stop command and correcting a timing for supplying said stop command in said control means in response to the detected error.

20. A positioning control device as defined in claim 19 wherein said learning means includes:
means for detecting said error;
memory means for storing offset data associated with the detected error, said offset data being read out for a next positioning control; and
correction means for correcting one or more of factors determining the timing for supplying said stop command in said control means by using the read out offset data as a parameter.

21. A positioning control device as defined in claim 20 wherein said correction means corrects the value of at least one of the detected position data and the target value data.

22. A positioning control device as defined in claim 19 wherein said position detection means comprises:
a coil assembly including primary coils disposed at predetermined locations axially spaced from one another and secondary coils provided in association with said primary coils, said coil assembly being fixed at one end of said cylinder in such a manner that said rod is slidably disposed through a space in said primary and secondary coils;
a plurality of rings made of magnetic substance and provided on said rod with a predetermined axial interval therebetween;
a circuit for exciting each of said primary coils with one of reference AC signals which are out of phase with one another;
a circuit for summing output of said secondary coils and thereby producing an output signal resulting by phase shifting the reference AC signals in accordance with a relative linear position of said rod; and
a circuit for detecting a phase difference between a predetermined one of the reference AC signal and the output signal of said summing circuit to obtain detected phase difference data as piston rod position data.

23. A positioning control device as defined in claim 19 wherein said position detection means comprises:
a stator including poles disposed with a predetermined interval therebetween in the circumferential direction and being respectively provided with a primary coil and a secondary coil wound thereon, said stator being fixed on one end of said cylinder in such a manner that said rod is slidably disposed through a space defined by said poles with a predetermined gap being formed between said rod and said poles;
projections provided, with a predetermined axial pitch, at least on the surface of said rod opposing each of said poles in such a manner that a predetermined difference is produced among said poles in the corresponding relationship between said projections and end portions of said poles, said rod being made of magnetic substance;
a circuit for exciting each of said primary coils with one of reference AC signals which are out of phase with adjacent poles by a predetermined electrical angle;
a circuit for summing outputs of said secondary coils and thereby generating an output signal resulting by phase shifting the reference AC signals in accordance with a relative linear position of said rod; and
a circuit for detecting a phase difference between a predetermined one of the reference AC signal and the output signal of said summing circuit to obtain detected phase difference data as piston rod position data.

24. A piston rod position control system for a fluid powered cylinder comprising:
a cylinder;
a piston with a rod connected thereto, capable of linear movement within the cylinder;
a coil assembly including primary coils disposed at predetermined locations axially spaced from one another and secondary coils provided in association with said primary coils, said coil assembly being fixed at one end of said cylinder in such a manner that said rod is slidably disposed through a space in said primary and secondary coils;

a plurality of rings made of magnetic substance and provided on said rod with a predetermined axial interval therebetween;

a circuit for exciting each of said primary coils with one of reference AC signals which are out of phase with one another;

a circuit for summing outputs of said secondary coils and thereby producing an output signal resulting by phase shifting the reference AC signals in accordance with the relative linear position of said rod;

a circuit for detecting a phase difference between a predetermined one of the reference AC signal and the output signal of said summing circuit to obtain detected phase difference data, the phase difference value of which is directly indicative of piston rod position;

compensation means for modifying at least one of the value of the phase difference value indicative of piston rod position and a predetermined target position value;

comparison means for comparing the phase difference value and the target position value after the modification by said compensation means; and drive control means for controlling the movement of said cylinder in accordance with the result of comparison by the comparison means.

25. A piston rod position control system for a fluid powered cylinder comprising:

a cylinder;

a piston with a rod connected thereto, capable of linear movement within the cylinder;

a stator including poles disposed with a predetermined interval therebetween in the circumferential direction and being respectively provided with a primary coil and a secondary coil wound thereon, said stator being fixed on one end of said cylinder in such a manner that said rod is slidably disposed through a space defined by said poles with a predetermined gap being formed between said rod and said poles;

projections provided, with a predetermined axial pitch, at least on the surface of said rod opposing each of said poles in such a manner that a predetermined difference is produced among said poles in the corresponding relationship between said projections and end portions of said poles, said rod being made of magnetic substance;

a circuit for exciting each of said primary coils with one of reference AC signals which are out of phase with adjacent poles by a predetermined electrical angle;

a circuit for summing outputs of said secondary coils and thereby generating an output signal resulting by phase shifting the reference AC signals whereby the value of phase shifts is a function of relative linear position of said rod;

a circuit for detecting a phase difference between a predetermined one of the reference AC signal and the output signal of said summing circuit to obtain detected phase difference data, the phase difference value of which is directly indicative of piston rod position;

compensation means for modifying at least one of the value of the phase difference value indicative of piston rod position and a predetermined target position value;

comparison means for comparing the phase difference value and the target position value after the modification by said compensation means; and drive control means for controlling the movement of said cylinder in accordance with the result of comparison by the comparison means.

* * * * *